(12) United States Patent
Chappell et al.

(10) Patent No.: US 10,534,873 B2
(45) Date of Patent: Jan. 14, 2020

(54) COMPREHENSIVE, MULTI-SPECIES ENVIRONMENTAL MODELING SYSTEM

(71) Applicants: Mark A Chappell, Vicksburg, MS (US); Michael L. Mayo, Vicksburg, MS (US); Jonathon A. Brame, Vicksburg, MS (US); Matthew C. Brondum, Vicksburg, MS (US)

(72) Inventors: Mark A Chappell, Vicksburg, MS (US); Michael L. Mayo, Vicksburg, MS (US); Jonathon A. Brame, Vicksburg, MS (US); Matthew C. Brondum, Vicksburg, MS (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 284 days.

(21) Appl. No.: 15/273,630

(22) Filed: Sep. 22, 2016

(65) Prior Publication Data
US 2018/0082000 A1 Mar. 22, 2018

(51) Int. Cl.
*G06F 17/18* (2006.01)
*G06F 17/50* (2006.01)
*G06Q 10/06* (2012.01)

(52) U.S. Cl.
CPC ......... *G06F 17/5009* (2013.01); *G06F 17/18* (2013.01); *G06Q 10/063* (2013.01); *G06F 2217/16* (2013.01)

(58) Field of Classification Search
CPC .. G06F 17/5009; G06F 17/18; G06F 2217/16; G06Q 10/00
USPC .................................................. 703/2, 11, 12
See application file for complete search history.

(56) References Cited

U.S. PATENT DOCUMENTS

| | | | | |
|---|---|---|---|---|
| 2012/0290267 A1* | 11/2012 | Arjona Antolin | .... | G06Q 30/018 702/188 |
| 2014/0081579 A1* | 3/2014 | Tyburski | ................ | G06Q 40/04 702/19 |

OTHER PUBLICATIONS

Gavin Kenny et al., FIJICLIM description and users guide, 2000, The International Global Change Institute (IGCI), University of Waikato, pp. 2-35.*

(Continued)

*Primary Examiner* — Juan C Ochoa
(74) *Attorney, Agent, or Firm* — Brian C. Jones

(57) ABSTRACT

The present invention is a computer modeling system for creating a comprehensive environmental impact model. The system performs a series of novel functions to reflect the impact of multiple emissions on all species of interest within an environment at designated concentration levels. The system can be further utilized as a repository to update environmental data received from scientific researchers and to update existing models accordingly. The system integrates new data and updates calculations to create increasingly complex, comprehensive and reliable predictive models for users, which include US and foreign entities charged with developing emissions standards.

20 Claims, 7 Drawing Sheets

(56) References Cited

OTHER PUBLICATIONS

Tom M.L. Wigley, MAGICC/SCENGEN 5.3: User Manual (version 2), Sep. 2008, pp. 1-81.*
Boit et al. "Large-scale impact of climate change vs. land-use change on future biome shifts in Latin America", May 2016, Global change biology 22.11, 34 pages.*
Carlo Giupponi and Marta Carpani, "Recent developments in indicators and models for agri-environmental assessment", 2006, Italian Journal of Agronomy 1.4, pp. 647-664.*

* cited by examiner

COMPREHENSIVE, MULTI-SPECIES ENVIRONMENTAL MODELING SYSTEM

STATEMENT REGARDING FEDERALLY SPONSORED RESEARCH OR DEVELOPMENT

The invention described herein was made by an employee of the United States Government and may be manufactured and used by the Government of the United States of America for governmental purposes without the payment of any royalties thereon or therefore.

FIELD OF INVENTION

This invention relates to the field of data processing and more specifically to an apparatus for modeling the environmental effects of a chemical or chemical combination.

BACKGROUND OF THE INVENTION

The US Environmental Protection Agency (EPA) and agencies in 154 countries currently face the daunting task of developing emissions standards. In 1992, 154 nations signed the United Nations Framework Convention on Climate Change (UNFCCC). This treaty commits signatory governments to reduce atmospheric concentrations of greenhouse gases with the goal of "preventing dangerous anthropogenic interference with Earth's climate system."

The objective of all emissions standards is to maintain concentration levels below a threshold that adversely affects one or more species within an environment. While many environmental studies are conducted in the US and internationally, there is currently no centralized repository for the data or mechanism for international collaboration to utilize this data for creating environmental models.

Commonly-owned U.S. application Ser. No. 15/273,611, filed of even date herewith, disclosed such a system for modeling the effect of various emissions at designated concentration levels on individual species. However, there is no system which is capable of taking into account the cumulative effect of other emissions present, as well as the impact on multiple species in a single environment.

There is an unmet need for a system for creating a comprehensive model of the impact of multiple emissions on all species of interest within an environment.

There is a further unmet need for a centralized system which can be used as a repository to accumulate and analyze environmental data from all sources, and to make reliable models available to the scientific community.

BRIEF SUMMARY OF THE INVENTION

One embodiment of the present invention is a computer apparatus for creating a comprehensive, predictive environmental impact model. The apparatus instantiates emission objects representing single or compound emissions. These objects track emission properties and include a processing function for simultaneously updating multiple singular or interdependent species impact models associated with an emission, in real time.

Each emissions object contains one or more species impact models which represent the impact of an emission on a species. The species impact model may be any data structure known in the art that can store value pairs of a quantified species impact value linked to an emissions concentration value. The apparatus also include a composite index processor that can determine a cumulative effect of multiple emissions.

In other embodiments, extrapolation and update processors allow statistical extrapolation of value pairs and updating emission properties.

BRIEF DESCRIPTION OF SEVERAL VIEWS OF THE DRAWING(S)

TERMS OF ART

Figure 1:
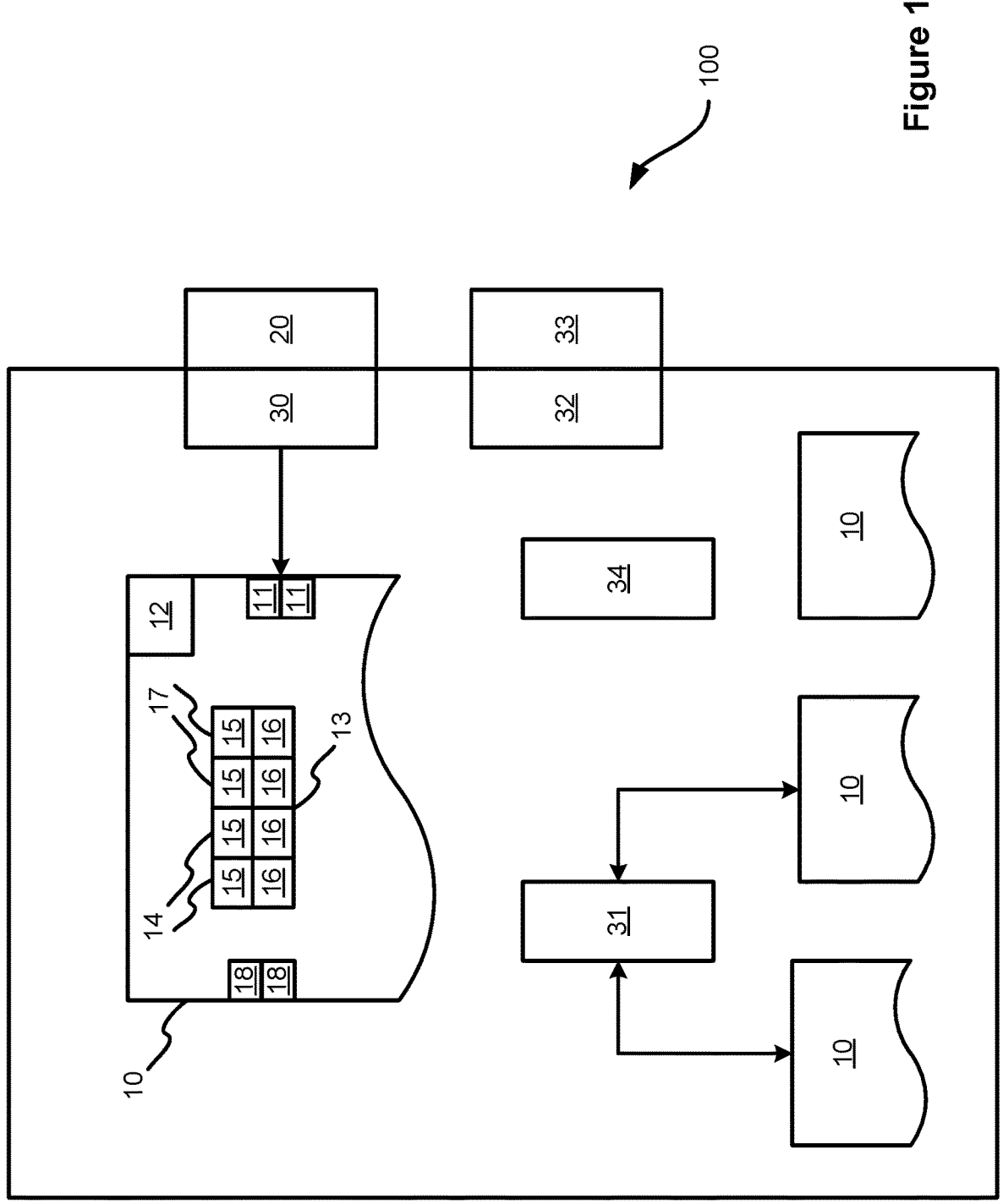
FIG. 1 illustrates an exemplary embodiment of a computer apparatus for creating a species impact model.

As used herein, the term "array" refers to any data structure known in the art which may be used to store an ordered arrangement of data.

As used herein, the term "composite index" refers to a predicted percentage of species which are affected by a given emission or combination of emissions over a given period of time.

As used herein, the term "configured" refers to software which physically causes a single computer processor to perform multiple processing functions concurrently to operate as multiple computers, or modified functionality and modified resource allocation (e.g., programmed with software or circuitry to perform an action).

As used herein, the term "data values" refers to values that express the condition, state or quantity of stored data or properties. Data values may include quantified species impact values (i.e. the percentage of a species affected by a given concentration) and emission concentration values (i.e. the concentration of an emission in an environment.)

As used herein, the term "function" refers to any set of computer instructions or segment of code that causes or modifies signals, circuitry, and resources to operate as a separate processing component.

As used herein, the term "interface" refers to a component receiving input data, sensed data, or retrieved data.

As used herein, the term "instantiate" refers to the fabrication of a data object or structure which may or may not have independent processing capability.

As used herein, the term "link" refers to a pointer, link, or path, or to assigning a common property, designation or identifying value.

As used herein, the term "model" refers to a data structure which tracks two or more levels or types of relationships between objects, tables, data structures, or functions.

As used herein, the term "native units" refers to units of measure in which data is received or acquired prior to conversion, modification, or translation.

As used herein, the term "predictive model" refers to a data structure which contains extrapolated data.

As used herein, the term "processor" refers to any code segment, circuitry or computer system or other apparatus capable of performing a logical, mathematical of functional operation and/or transforming the type, state, value or condition of an actual or modeled entity.

As used herein, the term "reliability" refers to a statistical level of expected accuracy.

As used herein, the term "sensitivity analysis type" refers to the type of analysis performed to determine sensitivity to variations in equations.

As used herein, the term "server" refers to a computer apparatus or system of processing components, circuitry, or software which is used to carry out storage and retrieval of data, data structures, and objects.

As used herein, the term "species impact" means any measurable and/or observable impact on a species, including but not limited to the natural development, reproduction, physical characteristics, growth, mortality, life span, resistance or any other characteristic of a species of plant or animal as a result of an alteration of the environmental in which the species is found.

As used herein, the term "static" refers to data or a state which does not change during a process or processing session. Static values may or may not be programmed as non-modifiable instructions or otherwise encoded into computer circuitry.

As used herein, the term "statistically extrapolated data pairs" refers to pairs of associated emissions concentration values and quantified species impact values, where the emissions concentration values are obtained using a statistical function.

As used herein, the term "update function" refers to a function which updates a data structure, value, property or instruction.

As used herein, the term "value pair" refers to data having a one to one relationship including, but not limited to, data values.

DETAILED DESCRIPTION OF THE INVENTION

FIG. 1 illustrates an exemplary embodiment of computer apparatus 100 for creating an environmental impact model. Computer apparatus 100 includes multiple emission objects 10 and a composite index processor 34. Each emission object 10 represents at least one emission type. In certain embodiments, emission object 10 may represent multiple emitted substances. Composite index processor 34 is configured to perform composite index function 600.

Each emission object 10 includes emission properties 11, as well as processing function 12 for updating emission properties 11. Each emission object 10 also includes a species impact model 13, which represents an impact of the quasi-unique emission on at least one species. In certain embodiments, species impact model 13 is an array. Species impact model 13 includes at least two value pairs 14. Each value pair 14 includes a quantified species impact value 15 linked to an emissions concentration value 16. Emissions concentration values 16 may be expressed in native measurement units.

In certain embodiments, processing function 12 also performs extrapolation function 300. Extrapolation function 300 populates species impact model 13 with at least one statistically extrapolated value pair 17.

Computer apparatus 100 may also include an interface 20 to receive new emission properties 11. Interface 20 is coupled with an update processor 30 to update multiple emission properties 11 in real time based on new emission properties 11. Update processor 30 may recursively update emission objects 10.

Computer apparatus 100 may also include a toxic equivalency model processor 31. Toxic equivalency model processor 31 identifies toxic equivalent values by extracting emissions concentration values 16 from two or more emissions data objects 20. Toxic equivalency model processor 31 can display emissions concentration values 16 in native units.

In certain embodiments, each emission object 10 includes at least one substance parameter value 18 used as a data key. Substance parameter value 18 may be a static quantified species impact value 15 or may be modified by a user. In certain embodiments, at least one quantified species impact value 15 of one emission object 10 is used as the data key to retrieve an equivalent emissions concentration value 16 from at least one other emission object 10.

Computer apparatus 100 may also include a reliability processor 32 configured to perform reliability function 400. Reliability function 400 represents the sensitivity of a function to changes in input variables. An input interface 33 of reliability processor 32 receives input such as a sensitivity analysis type input, a substance parameter data set P, and a sample number S.

Figure 2:
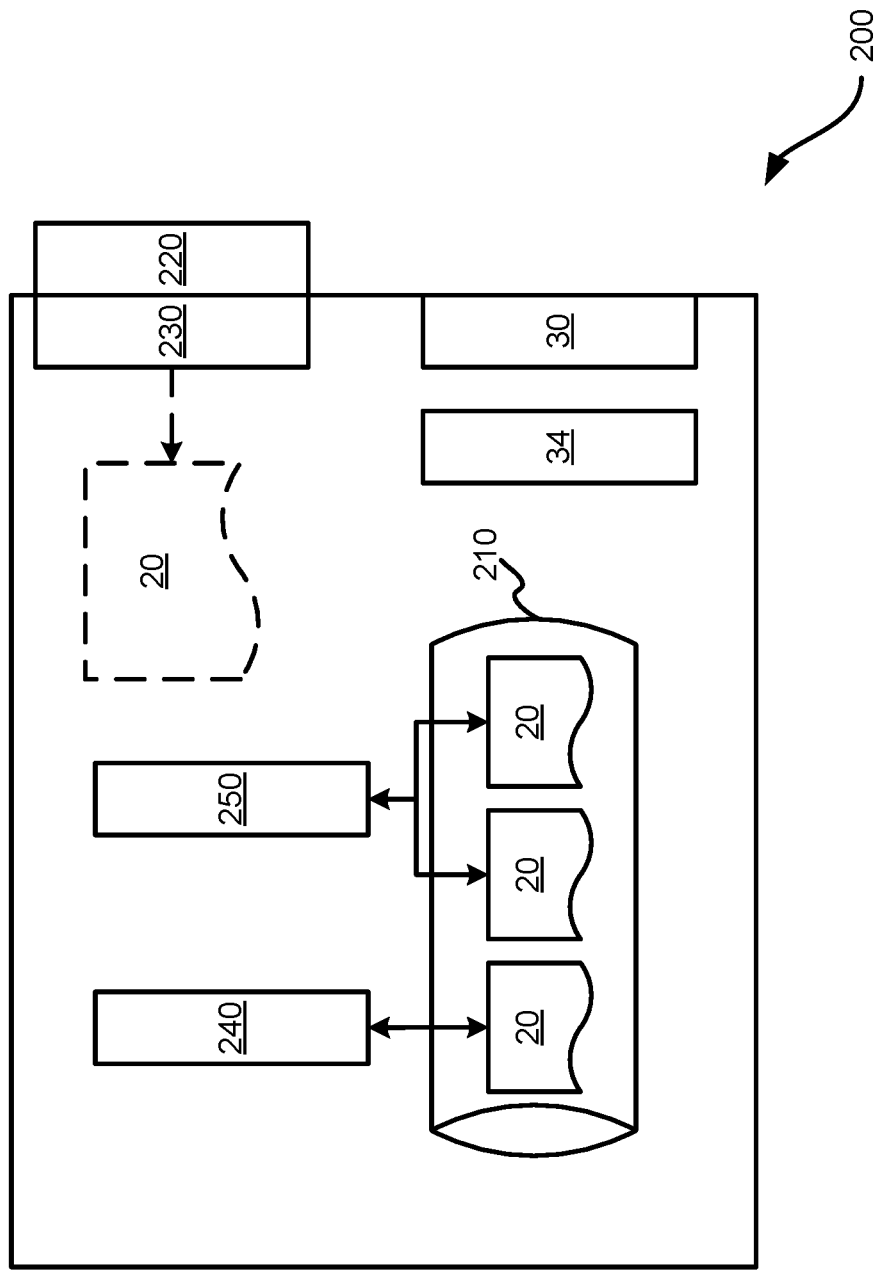
FIG. 2 illustrates an exemplary embodiment of a computer system for creating a species impact model.

FIG. 2 illustrates an exemplary embodiment of computer system 200 for creating an environmental impact model. A server 210 contains multiple emission objects 10. A data interface 220 receives emission properties 11. An instantiation processor 230 compares the input emission property value to emission properties 11 in emission objects 10. If emission properties 11 do not match, instantiation processor 230 instantiates a new emission object 10. Computer system 200 also includes an extrapolation processor 240, update processor 30, and composite index processor 34.

Computer system 200 may also include an environmental impact model processor 260 configured with instructions to retrieve emissions concentration values 16 from multiple species impact models 13. These species impact models 13 may be associated by identifying emission properties 11 within emission objects 10 based on user defined selection criteria. These criteria represent at least one emission property 11 of emission objects 10.

Figure 3:
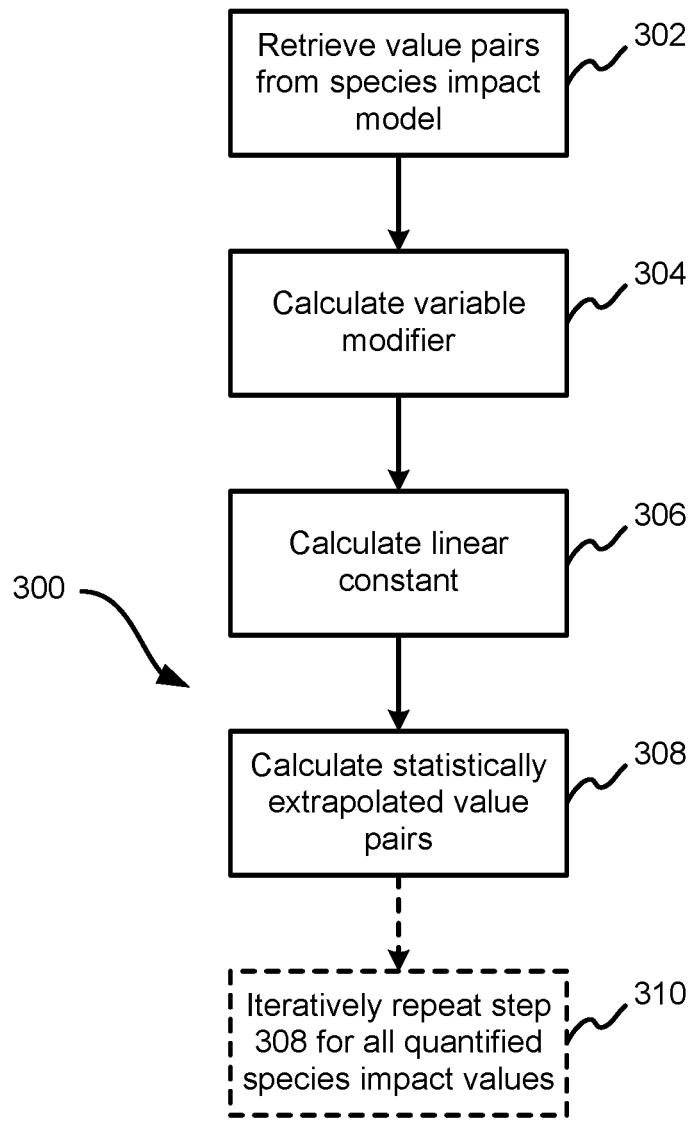
FIG. 3 is a flowchart illustrating an exemplary embodiment of an extrapolation function.

FIG. 3 is a flowchart illustrating an exemplary embodiment of extrapolation function 300.

In step 302, function 300 retrieves value pairs 14 from species impact model 13.

In step 304, function 300 calculates a variable modifier b using the equation $$b = \frac{\sum_{i=1}^{n} x_i y_i - n x_m y_m}{\sum_{i=1}^{n} x_i^2 - n x_m^2}$$

For this equation, n is the number of value pairs 14 from species impact model 13, $x_i$ is the quantified species impact value 15 of value pair 14 n, $y_i$ is the emissions concentration value 16 of value pair 14 n, $x_m$ is the mean quantified species impact value, and $y_m$ is the mean emissions concentration value.

In step 306, function 300 calculates a linear constant k using the equation $$k = \bar{y} - b\bar{x};$$

In step 308, function 300 calculates at least one statistically extrapolated value pair 17 using the equation $$y = bx + k,$$

For this equation, x is the quantified species impact value 15 of statistically extrapolated value pair 17, and y is the emissions concentration value 16 associated with x.

In optional step 310, function 300 iteratively repeats step 308 for all quantified species impact values 15 input by a user.

Figure 4:
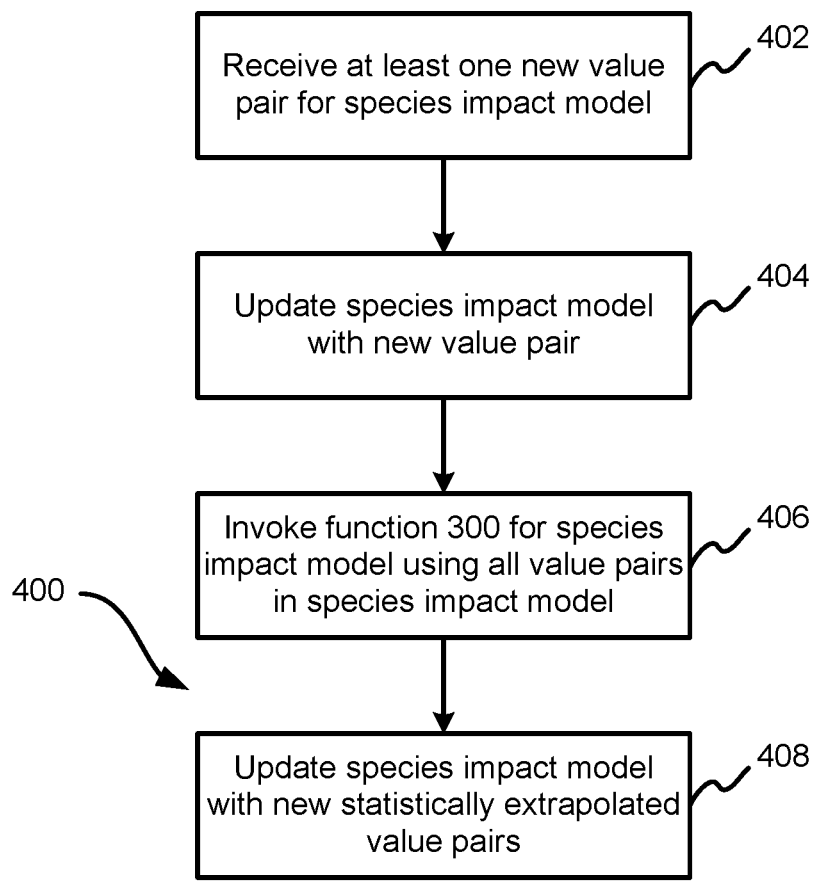
FIG. 4 is a flowchart illustrating an exemplary embodiment of an update function.

FIG. 4 is a flowchart illustrating an exemplary embodiment of update function 400.

In step 402, function 400 receives at least one new value pair 14 for species impact model 13.

In step 404, function 400 updates species impact model 13 with the new value pair 14.

In step 406, function 400 invokes function 300 for species impact model 13 using all value pairs 14 in species impact model 13 to calculate new statistically extrapolated value pairs 17.

In step 408, function 400 updates species impact model 13 with the new statistically extrapolated value pairs 17.

Figure 5:
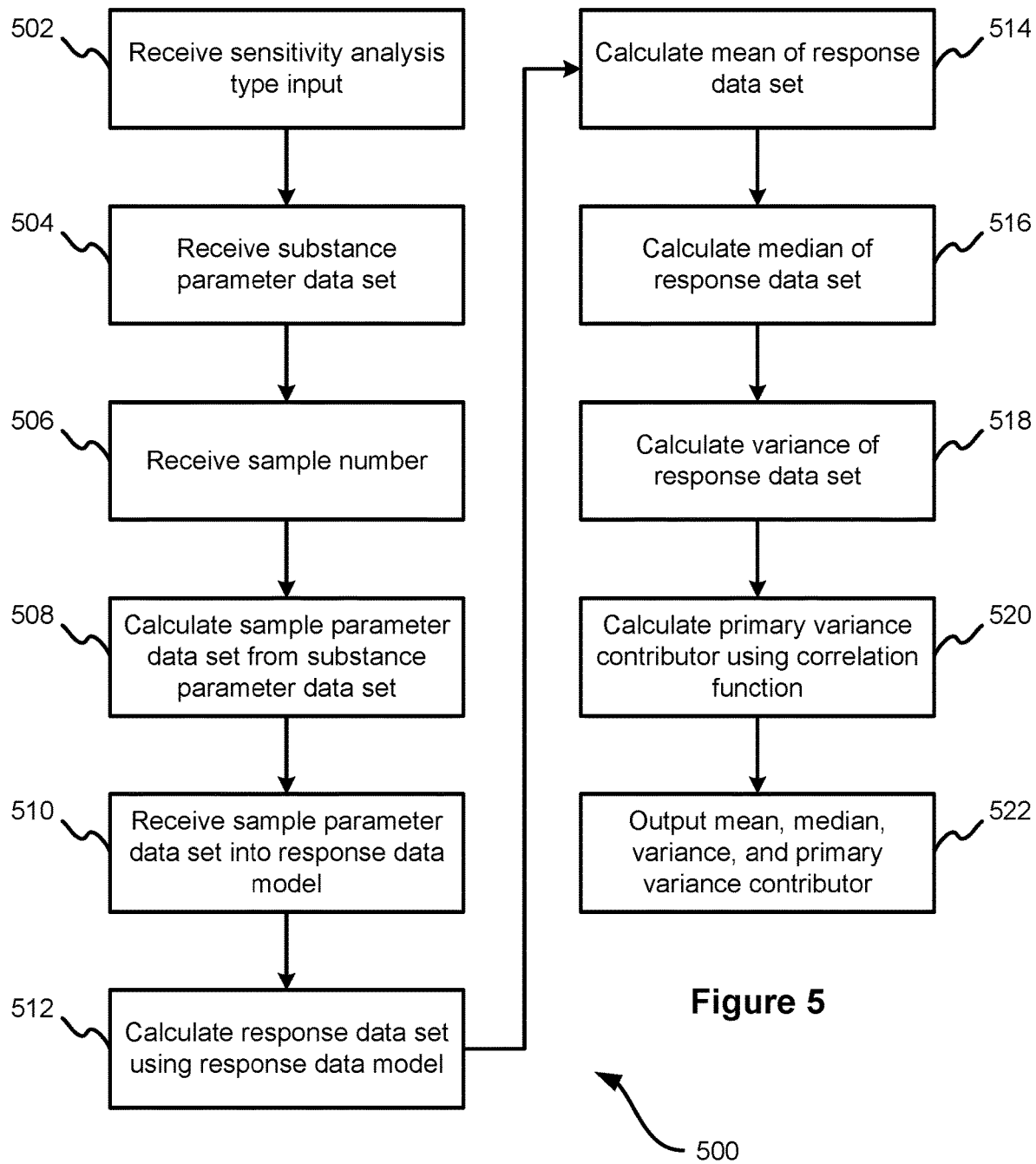
FIG. 5 is a flowchart illustrating an exemplary embodiment of a reliability function.

FIG. 5 is a flowchart illustrating an exemplary embodiment of reliability function 500.

In step 502, function 500 receives a sensitivity analysis type input. The sensitivity analysis type input is selected from the group consisting of: a patch variation function and a one-at-a-time variation function.

In step 504, function 500 receives a substance parameter data set P. The substance parameter data set P includes at least one parameter mean selected from the group consisting of: molecular weight, enthalpy of vaporization, enthalpy of solution, vapor pressure, water-octanol partition ratio, melting point, first-order reaction rate constant for substance with hydroxide radicals in air, first-order degradation constant for substance in water, area of freshwater, and concentration. The substance parameter data set P also includes at least one variation interval selected from the group consisting of: standard error of the parameter mean, standard deviation, and 95% confidence interval.

In step 506, function 500 receives a sample number S.

In step 508, function 500 calculates a sample parameter data set $Q_S$ from the substance parameter data set P using a Markov Chain Monte Carlo algorithm. The Markov Chain Monte Carlo algorithm calculates the sample parameter data set $Q_S$ using a distribution selected from the group consisting of: bounded uniform distribution, normal distribution, log-normal distribution, and log-logistic distribution.

In step 510, function 500 receives the sample parameter data set $Q_S$ into the response model.

In step 512, function 500 calculates a response data set $R_S$ using the response model.

In step 514, function 500 calculates a mean of the response data set $R_S$.

In step 516, function 500 calculates a median of the response data set $R_S$.

In step 518, function 500 calculates a variance of the response data set $R_S$.

In step 520, function 500 calculates a primary variance contributor from the response data set $R_S$ using a correlation function.

In step 522, function 500 outputs the mean, the median, the variance, and the primary variance contributor.

Figure 6A:
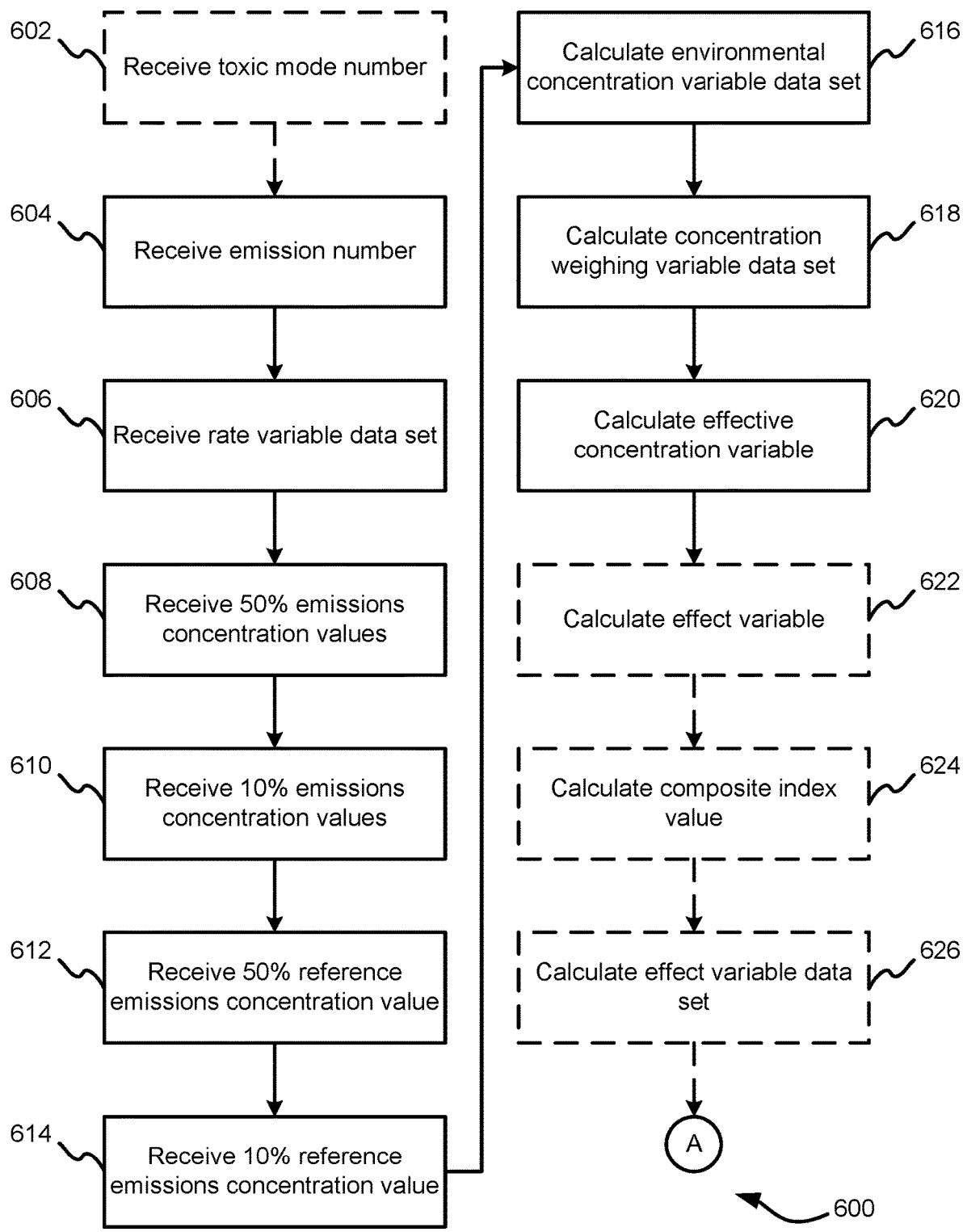
FIGS. 6a and 6b are flowcharts illustrating an exemplary embodiment of composite index function.
Figure 6B:
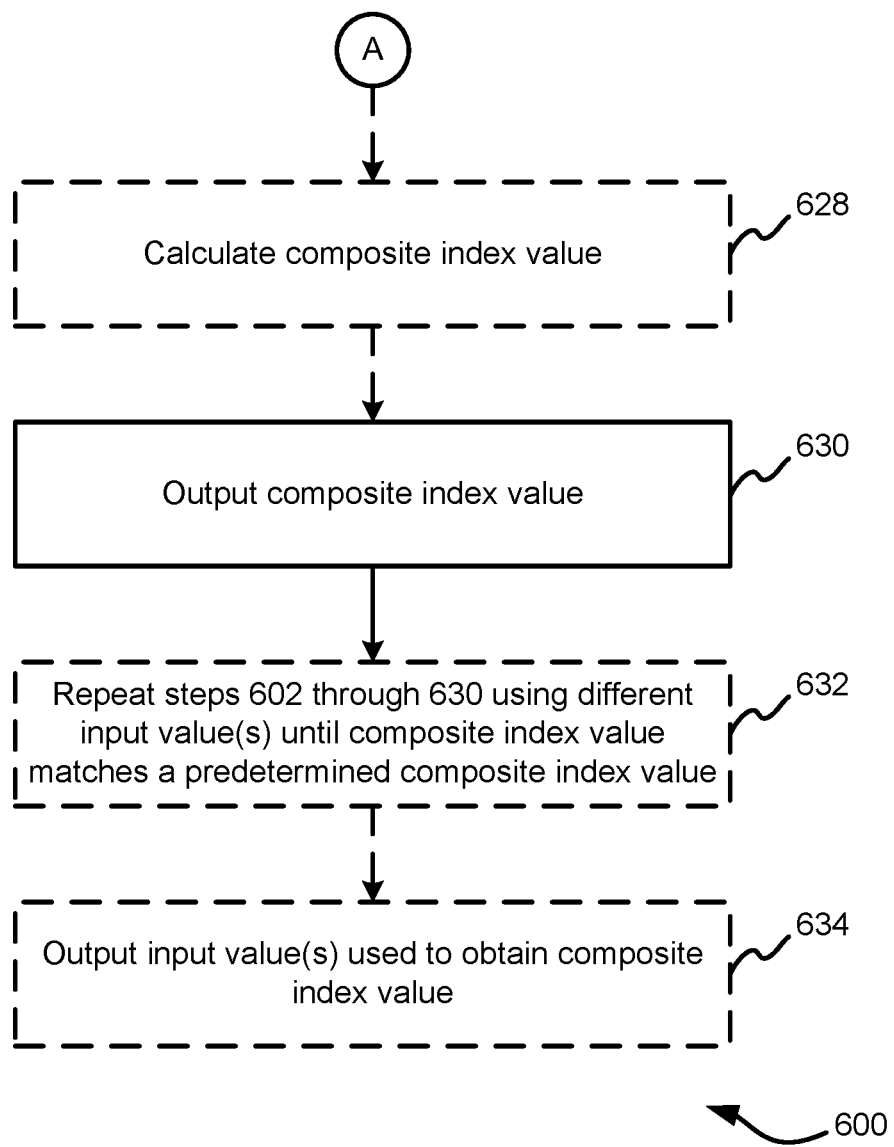

FIGS. 6a and 6b are flowcharts illustrating an exemplary embodiment of composite index function 600. Function 600 generates a composite index value $V_t$, which provides the impact of given concentrations of a multiple emitted substances for a given period of time.

In optional step 602, function 600 receives a toxic mode number N. Toxic mode number N represents the number of different toxic modes under investigation. A toxic mode is a type of adverse biological response characterized by a common set of physiological and behavioral symptoms.

In step 604, function 600 receives an emission number M. Emission number M represents the number of emission types being modeled in an environment.

In step 606, function 600 receives a rate variable data set $I_j$. $I_j$ is a rate at which each emission type enters the environment over time.

In step 608, function 600 receives a plurality of emissions concentration values $X_j$. The quantified species impact value linked with each emissions concentration value is 50%.

In step 610, function 600 receives a plurality of emissions concentration values $Y_j$. The quantified species impact value linked with each emissions concentration value is 10%.

In step 612, function 600 receives a reference emissions concentration value X. The linked quantified species impact value is 50%.

In step 614, function 600 receives a reference emissions concentration value Y. The linked quantified species impact value is 10%.

In step 616, function 600 calculates an environmental concentration variable data set $C_j$.

In step 618, function 600 calculates a concentration weighing variable data set $\omega_j$ using the equation:

$$\omega_j = \left(\frac{C_j}{X_j}\right)^{\frac{\ln(X/Y)}{\ln(X_j/Y_j)}-1}$$

In step 620, function 600 calculates an effective concentration variable $C_{eff}$ using the equation:

$$C^{eff} = \sum_{j=1}^{M} \omega_j \left(\frac{X}{X_j}\right) C_j$$

In optional step 622, function 600 calculates an effect variable XF using the equation:

$$XF = \omega_i \left(\frac{X}{X_i}\right) \frac{\ln(X/Y)}{\ln(X_i/Y_i)} \frac{p(C_i)}{1 - p(C_i)} \prod_{m=1}^{M} \int_0^{c_m^{eff}} p(c)dc$$

In optional step 624, function 600 calculates composite index value $V_t$ using the equation:

$$V_t = XF \times FF \times I$$

In optional step 626, function 600 calculates an effect variable data set $XF_i$ using the equation:

$$XF_i = \omega_i \left(\frac{X}{X_i}\right) \frac{\ln(X/Y)}{\ln(X_i/Y_i)} \frac{p(C_i)}{1 - p(C_i)} \prod_{m=1}^{M} \int_0^{c_m^{eff}} p(c)dc$$

In optional step 628, function 600 calculates composite index value $V_t$ using the equation:

$$V_t = \sum_{i=1}^{N} XF_i \times FF_i \times I_i$$

In step 630, function 600 outputs composite index value $V_t$.

In optional step 632, function 600 repeats steps 602 through 630 using at least one different input value for at least one of toxic mode number N, emission number M, rate variable data set Ij, emissions concentration values $X_j$; emissions concentration values $Y_j$, reference emissions concentration value X, or reference emissions concentration value Y until composite index value $V_t$ matches a predetermined composite index value $V_P$.

In optional step 634, function 600 outputs the input value or values used to obtain composite index value $V_t$.

It will be understood that many additional changes in the details, materials, procedures and arrangement of parts and steps, which have been herein described and illustrated to explain the nature of the invention, may be made by those skilled in the art within the principle and scope of the invention as expressed in the appended claims.

It should be further understood that the drawings are not necessarily to scale; instead, emphasis has been placed upon illustrating the principles of the invention.

What is claimed is:

1. A computer apparatus for creating an environmental impact model comprised of:
   a plurality of emission objects representing emission types, each of said plurality of emission objects comprised of:
   emission properties,
   a processing function which is invoked to update said emission properties,
   at least one species impact model comprised of value pairs wherein each of said value pairs links a quantified species impact value to an emission concentration value to represent the impact of an emission type on at least one species; and
   a composite index processor configured to perform a composite index function;
   and further includes an interface to receive new emission properties;
   wherein said composite index function is repeated with at least one different input until a composite index value $V_t$ matches a predetermined composite index value $V_P$, wherein said at least one different input is selected from the group consisting of: an emission number M, a rate variable data set Ij, emissions concentration values $X_j$; said emissions concentration values $Y_j$, a reference emissions concentration value X, and a reference emissions concentration value Y.

2. The computer apparatus of claim 1 wherein at least one emission type is comprised of a plurality of emitted substances.

3. The computer apparatus of claim 1 wherein said processing function is invoked to perform an extrapolation function, wherein said extrapolation function populates said species impact model with at least one statistically extrapolated value pair.

4. The computer apparatus of claim 1 wherein said interface is coupled with an update processor to update multiple emission properties based on said new emission properties.

5. The computer apparatus of claim 1, which further includes a toxic equivalency model processor to identify toxic equivalent values by extracting said emissions concentration values from two or more emissions data objects.

6. The computer apparatus of claim 5, wherein said toxic equivalency model processor displays said emissions concentration values in native units.

7. The computer apparatus of claim 5 wherein each of said plurality of emission objects further includes at least one substance parameter value used as a data key.

8. The computer apparatus of claim 7 wherein at least one quantified species impact value of one of said plurality of emission objects is used as a data key to retrieve an equivalent concentration value from at least another of said plurality of emission objects.

9. The computer apparatus of claim 7, wherein said at least one substance parameter value is a static species impact value.

10. The computer apparatus of claim 7, wherein said at least one substance parameter value may be modified by a user.

11. A computer apparatus for creating an environmental impact model comprised of:
    a plurality of emission objects representing emission types, each of said plurality of emission objects comprised of:
    emission properties,
    a processing function which is invoked to update said emission properties,
    at least one species impact model comprised of value pairs wherein each of said value pairs links a quantified species impact value to an emission concentration value to represent the impact of an emission type on at least one species; and
    a composite index processor configured to perform a composite index function;
    and further includes an interface to receive new emission properties;
    wherein said composite index function is repeated with at least one different input until a composite index value $V_t$ matches a predetermined composite index value $V_P$, wherein said at least one different input is selected from the group consisting of: a toxic mode number N, an emission number M, a rate variable data set Ij, emissions concentration values $X_j$; emissions concentration values $Y_j$, a reference emissions concentration value X, and a reference emissions concentration value Y.

12. The computer apparatus of claim 11 wherein at least one emission type is comprised of a plurality of emitted substances.

13. The computer apparatus of claim 11 wherein said processing function is invoked to perform an extrapolation function, wherein said extrapolation function populates said species impact model with at least one statistically extrapolated value pair.

14. The computer apparatus of claim 11 wherein said interface is coupled with an update processor to update multiple emission properties based on said new emission properties.

15. The computer apparatus of claim 11 which further includes a toxic equivalency model processor to identify toxic equivalent values by extracting said emissions concentration values from two or more emissions data objects.

16. The computer apparatus of claim 15, wherein said toxic equivalency model processor displays said emissions concentration values in native units.

17. The computer apparatus of claim 15 wherein each of said plurality of emission objects further includes at least one substance parameter value used as a data key.

18. The computer apparatus of claim 17 wherein at least one quantified species impact value of one of said plurality of emission objects is used as a data key to retrieve an equivalent concentration value from at least another of said plurality of emission objects.

19. The computer apparatus of claim 17, wherein said at least one substance parameter value is a static species impact value.

20. The computer apparatus of claim 17, wherein said at least one substance parameter value may be modified by a user.

\* \* \* \* \*